United States Patent
Kaplan

(10) Patent No.: US 7,653,726 B2
(45) Date of Patent: *Jan. 26, 2010

(54) ONLINE FORECASTING SYSTEM AND METHOD

(75) Inventor: Craig A. Kaplan, Aptos, CA (US)

(73) Assignee: Predictwallstreet, LLC, Capitola, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,141

(22) Filed: Nov. 3, 2008

(65) Prior Publication Data

US 2009/0119162 A1  May 7, 2009

Related U.S. Application Data

(63) Continuation of application No. 11/540,944, filed on Sep. 29, 2006, now Pat. No. 7,451,213.

(60) Provisional application No. 60/722,099, filed on Sep. 30, 2005.

(51) Int. Cl.
*G06F 13/00* (2006.01)

(52) U.S. Cl. .............. 709/224; 709/227; 709/228; 717/174

(58) Field of Classification Search ............ 709/220, 709/224, 226, 228; 715/716; 700/83
See application file for complete search history.

(56) References Cited

U.S. PATENT DOCUMENTS

| | | | |
|---|---|---|---|
| 6,640,145 B2 * | 10/2003 | Hoffberg et al. | 700/83 |
| 6,850,252 B1 * | 2/2005 | Hoffberg | 715/716 |
| 7,006,881 B1 * | 2/2006 | Hoffberg et al. | 700/83 |
| 7,072,863 B1 * | 7/2006 | Phillips et al. | 705/36 R |
| 7,451,213 B2 * | 11/2008 | Kaplan | 709/224 |

* cited by examiner

*Primary Examiner*—Khanh Q Dinh
(74) *Attorney, Agent, or Firm*—Perkins Coie LLP

(57) ABSTRACT

System and method for real-time on-line interactive forecasting of an element, the method comprising: receiving a user input for a forecast element; and capturing at least one forecast of an element or event, storing that at least one forecast of an element or event, and sending collective contributed forecast information back to the user who originally sent the input in response to the receipt of the user input for optional display. The method may optionally also include either or both of providing a minimal input forecast interface, and/or pre-queuing a list of elements for fast forecasting; receiving a user input for a forecast element. Computer program product for execution on a single computer or plurality of computers to implement the inventive method and system.

40 Claims, 3 Drawing Sheets

ONLINE FORECASTING SYSTEM AND METHOD

CROSS-REFERENCE TO RELATED APPLICATIONS

This application is a continuation of U.S. patent application Ser. No. 11/540,944 filed Sep. 29, 2006, now U.S. Pat. No. 7,451,213, entitled Online Forecasting System and Method, by Craig K. Kaplan, which claims the benefit of priority to U.S. Provisional Application Ser. No. 60/722,099, filed Sep. 30, 2005, entitled Improved Online Forecasting System, by Craig A. Kaplan, each of which applications is hereby incorporated by reference.

FIELD OF THE INVENTION

This invention pertains generally to systems and methods for on-line prediction and forecasting and more particularly to an interface for a one-click graphical interface for making future predictions or forecasts for an element where receipt of the one-click input by the system results in capturing a forecast of an element or event, storing that forecast of the element or event, and optionally the display of collective contributed forecast information back to the user who originally made and sent the input.

BACKGROUND

As described in co-pending U.S. Utility patent application Ser. No. 10/107,420 filed 26 Mar. 2002 and entitled System and Method for Forecasting Information Using Collective Intelligence from Diverse Sources (which application is incorporated by reference herein), it is possible to construct a real-time forecast system that includes: (a) means for gathering forecasts from a plurality of individuals or other entities within a defined period of time; (b) means of filtering and processing these individual forecasts to generate a collective forecast, and (c) means for communicating the collective forecast back to individuals very quickly.

However, even such a forecasting system generally operates with greater prediction or forecasting accuracy as greater numbers of forecasts are gathered from users (also referred to as contributors). Users, in turn, are more likely to provide a larger number of forecasts if one or more of and preferably all of the following are true of the system: (a) the system is very easy to use initially; (b) the system already has some forecasts or predictions at the time the user first uses the system; and (c) the system becomes even easier to use (or more useful with ease of use) upon repeated use.

Therefore, there remains a need for a system and method for forecasting that encourages new and previous users to continue to utilize such a forecasting system and method of forecasting by making it easier to use and contribute to such forecasts so that larger numbers of forecasts may be obtained and the forecasting accuracy may increase to the extent possible by the increased participation and number of contributions.

SUMMARY

Figure 1:
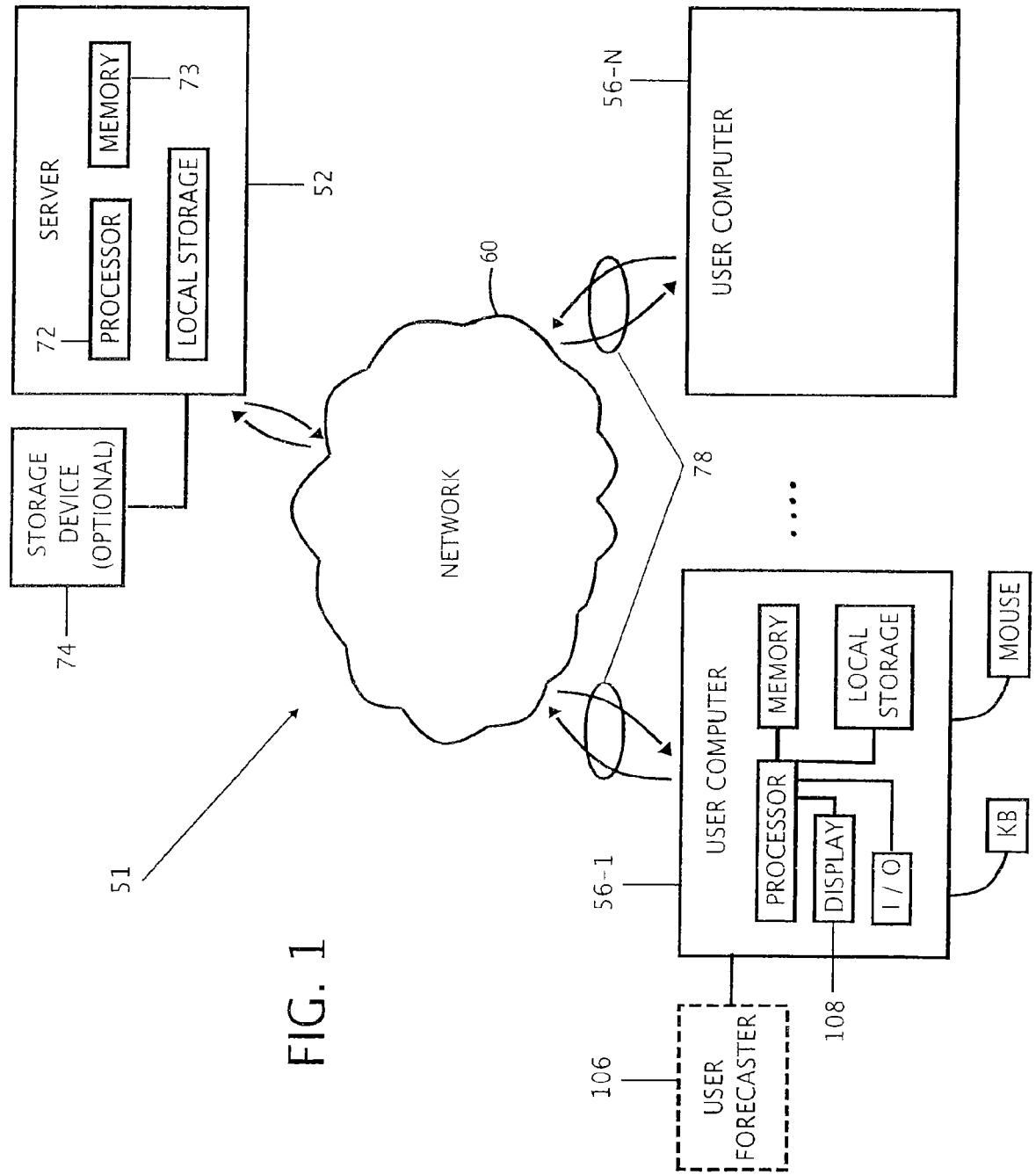
FIG. 1 is an illustration showing an exemplary embodiment of a system according to the invention.

In one aspect the invention provides a method for real-time on-line interactive forecasting of an element, the method comprising: providing a minimal input forecast interface; receiving a user input for a forecast element; and capturing at least one forecast of an element or event, storing that at least one forecast of an element or event, and sending collective contributed forecast information back to the user who originally sent the input in response to the receipt of the user input for optional display. The method may optionally also include pre-queuing a list of elements for fast forecasting; receiving a user input for a forecast element.

In another aspect, the invention provides a method for real-time on-line interactive forecasting of an element, the method comprising: pre-queuing a list of elements for fast forecasting; receiving a user input for a forecast element; and capturing at least one forecast of an element or event, storing that at least one forecast of an element or event, and sending collective contributed forecast information back to the user who originally sent the input in response to the receipt of the user input for optional display. The method may optionally also include providing a minimal input forecast interface.

In another aspect, the invention provides a system for real-time on-line interactive forecasting of an element, the system comprising: a minimal input forecast interface; a receiver block for receiving a user input for a forecast element; a capture block for capturing at least one forecast of an element or event; a storage device for storing that at least one forecast of an element or event; and communications device for sending collective contributed forecast information back to the user who originally sent the input in response to the receipt of the user input for optional display. This system may optionally further include or provide a minimal input forecast interface.

In another aspect, the invention provides a system for real-time on-line interactive forecasting of an element, the system comprising: a pre-queuing block for queuing a list of elements for fast forecasting; a receiver block for receiving a user input for a forecast element; a capture block for capturing at least one forecast of an element or event; a storage device for storing that at least one forecast of an element or event, and communications device for sending collective contributed forecast information back to the user who originally sent the input in response to the receipt of the user input for optional display. This system may also optionally further include a pre-queuing block for queuing a list of elements for fast forecasting.

In another aspect, the invention provides for separate client side and server side method steps and computer program product elements separately and in combination.

In another aspect, steps of the various embodiments of the method may be incorporated into the system by any hardware, software, firmware, or hybrid means to implement the inventive steps in the system.

In another aspect, the invention provides a computer program product stored on tangible media or residing in an electronically readable and accessible form, the computer program product including executable instructions for modifying the operation of a single computer or a plurality of computer to operated to provide a real-time on-line interactive forecasting of an element, the computer program instructions including instructions for: either: (i) providing a minimal input forecast interface, or (ii) pre-queuing a list of elements for fast forecasting, or both; receiving a user input for a forecast element; and capturing at least one forecast of an element or event, storing that at least one forecast of an element or event, and sending collective contributed forecast information back to the user who originally sent the input in response to the receipt of the user input for optional display.

DETAILED DESCRIPTION OF EMBODIMENTS OF THE INVENTION

In general, the more work a user has to do to get a useful result from a system, the less likely a user is to the use the system. In the system described in co-pending referenced U.S. Utility Patent Application System and Method for Forecasting Information Using Collective Intelligence from Diverse Sources referenced herein, system and method are described wherein users were asked to type in specific forecasts (e.g., closing prices for stocks) for particular times and dates in the future. This approach has the advantage of precision, and in some cases may be the preferred implementation of a forecasting system and method. However precision may at times for some users come at the cost of ease of use. Increasingly for many computer and information related tasks a graphical or non-text type input mechanism may be preferred.

FIG. 1 shows an exemplary embodiment of a system 51, incorporating a server 52 that may serve to interact with one or more users 54 over an interactive electronic medium such as computers 56 or other information appliances coupled to the server 52 over a network 60 such as the Internet. Network, server, and computer and communications links that are conventional in nature and not shown in the figure to avoid obscuring aspects of the invention.

The server 52 may include one or more processors 72 and processor coupled or associated memory 73 for any processing tasks that may be required. Such processing tasks may include controlling communications over the network to and from users, accessing one or more integrated or separate storage devices 74 such as for example hard disk drive persistent mass storage devices that may store programs, forecast data, element current values and historical values, and other system and user data described herein. Processing may also include activities of intelligent agents 75 (described in detail herein) and activities in support of processing user contributed forecasts or predictions to generate output composite or consensus forecasts or predictions as described herein elsewhere.

A user may access the server from a client side computer or information appliance (machine) 77 over the network communication link or line 78. The user may be provided with a computer program code or applet to display and execute the one-click scale forecasting interface on their machine. Local storage may be provided on the local user computer or information appliance for storing a token, cookie, or other identifier so that past predictions and forecasts, favorites, lists, queues, and the like that are usefully provided and associated with the user and with the user's forecasting or prediction history may be stored and communicated to the server and to programs executing on the server as appropriate.

Although a single server is illustrated, the functions and operations performed by the server may be distributed over a plurality of servers either for the purpose of scalability, redundancy, performance or for other reasons.

Exemplary One-Click Rating Scale Forecasting Interface

Figure 2:
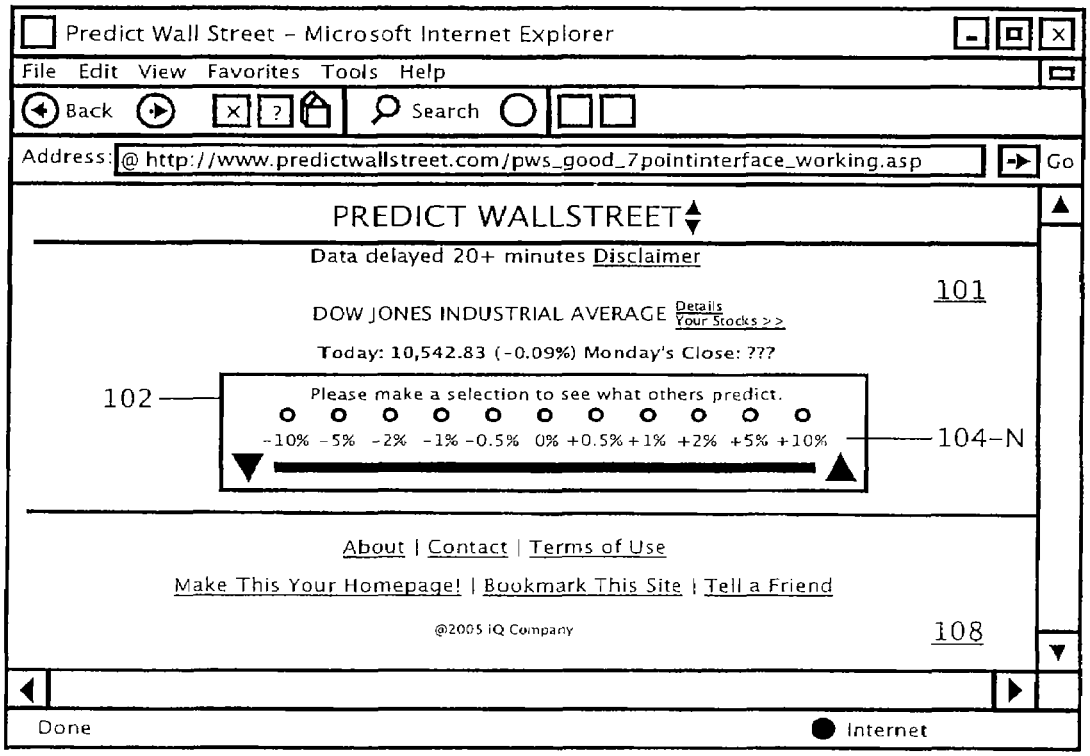
FIG. 2 is an illustration showing a display screen and the appearance of an embodiment of the one-click rating scale prediction interface.

In one non-limiting embodiment of the inventive system and method, the invention includes a one-click forecasting interface. With reference to FIG. 2, in at least one embodiment, the one-click forecasting interfaces 101 is coupled with a rating scale 102 having a plurality of values 104-N so that a user or contributing forecaster 106 merely needs to look at the one-click rating scale interface, such as a one-click rating scale forecasting interface 101 on the display screen 108, place a mouse tip (or other pointing or positioning device pointer) 110 on the rating scale and make a single input, such as right or left mouse button clicking, to input the forecast 120. Keystrokes may alternatively be used, as may a mouse (or other pointing device input) click coupled with a keystroke or some other minimal action different from actually typing a recognizable text or symbol string for a name or other identifier.

Figure 3:
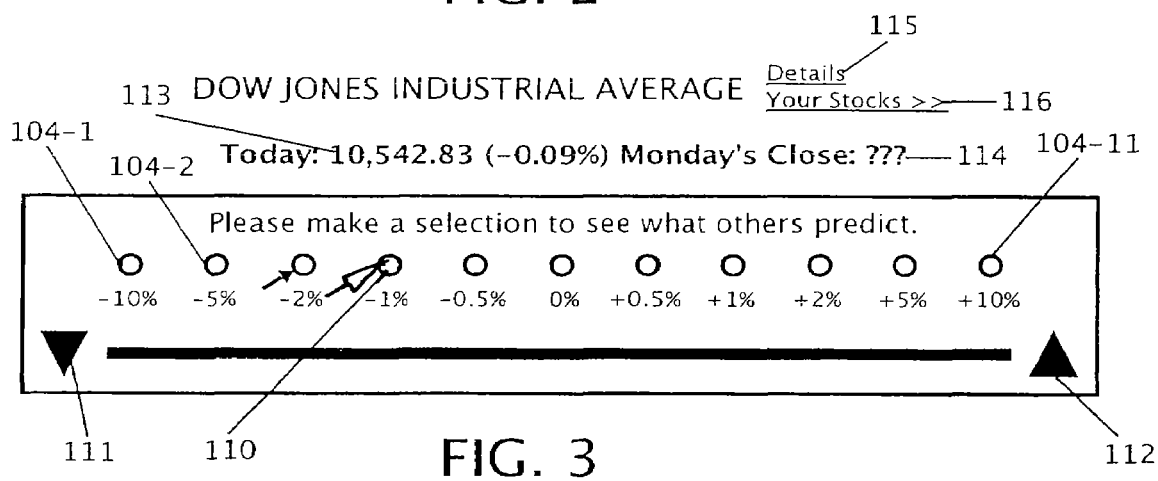
FIG. 3 is an illustration showing a portion of the one-click rating scale prediction interface in FIG. 2.

FIG. 3 illustrates the rating or input rating scale nature of one non-limiting embodiment of the interface in somewhat greater detail than may be seen from FIG. 2. In this particular illustration, the element that is to be rated for a change in value is the Dow Jones Industrial Average which at the time was at a value of 10,542.83 at 113, representing a −0.09% change at 114, and with the interface asking for a prediction of "Monday's Close:???" at 114. The interface includes a plurality of values 104-N with fixed or constant rating scale value increments or values, here shown 104-1 through 104-11 as −10%, −5%, −2%, −1%, ±0%, +1%, +2% +5%, and +10%. These values are merely illustrative and it will be apparent that any values may be used and that the scale may be linear or non-linear. Actual dollar value changes might be made for stock indexes, stock prices, or the like rather than percentage changes and/or a user may input a preference via a toggle or menu item. The user contributing forecaster may optionally merely click on the downward pointing arrow (red) 111 to make a prediction that the Dow Jones Industrial Average will go down, or click on the upward pointing arrow (green) 112 on the right to make a prediction that the Dow Jones Industrial Average will go up. The increments may be somewhat context sensitive so that they represent a reasonable range for upward or downward movement of the element based on some factor or set of factors, such as for example based on its historical trading range, recent predictions or forecasts by others, or on other factors.

Notice that in this non-limiting embodiment, the interface 101 also provides a clickable hover or hot spot for the user to select to see additional details 115 and to see a listing or the users stocks "Your Stocks" 116. These hot spots or menu items may change with the type of element displayed for prediction at the time.

Typing may for most users computer and/or information appliance require more effort than clicking a mouse or using some other pointing device to make an input. Moreover, requiring users to perform multiple actions (such as for example, typing one or more places or locations in an electronic form or web page and then clicking submit) requires more effort than a single mouse click. Furthermore, as input devices become more diverse, smaller, and may loose a full text keyboard or symbol input capability, other simpler forms of input may be more widely supportable. Graphical interfaces may also be preferred because of their intuitive nature over interfaces for which textual inputs or keyboard typing are employed, but embodiments of the invention are not limited to particular interfaces, except that interfaces that simplify user interaction such as a single-click interface are preferred. To maximize ease of use, this embodiment of the invention has a single-click rating scale based interface to the forecasting system. In a non-limiting embodiment, a single-click interface captures a single forecast of an element or event, stores that forecast, and displays useful collective forecast information back to the user all with a single click. Because user effort is minimized, and because feedback is almost immediate, the single-click rating scale interface helps maximize the number of forecasts per user. In some situations, though perhaps not all situations, maximizing the number of forecasts per user may often be an important goal.

Although single-click interfaces (such as the Amazon single-click ordering interface control described in U.S. Pat. No. 5,960,411, and less famously this inventor's 1994 patent (U.S. Pat. No. 5,280,275) entitled Graphical Interface Control Buttons With Scalar Values) have been used before for making purchases, this is the first time that such a single-click interface control has been used in conjunction with a forecasting system that initiates all of the actions required for accepting, storing, generating, and displaying a collective forecast. It may also be appreciated that the interface actually provides for a selection and click feature since by single-clicking on the values (discrete or continuous range based scales may be used) of the scale the user is actually inputting a predictions (such as a quantitative numerical prediction) and need not type the prediction or forecast before making the one input action. The single-click forecasting interface initiates the acceptance, storing, generation, and optional but advantageous display of the collective forecast. Even for one click purchasing systems and method, the user must by separate action, identify the goods or services that the user desires to purchase and then make a separate action to complete the purchase, not even including the need to complete a prior name, address, and credit card or other purchasing information prior to the click-based order completion. It will be appreciated where it is impractical or for other reasons not advantageous to provide a single-click interface, then reducing or minimizing the number of clicks or user actions is advantageous so that other embodiments of the invention may provide for two-click, three-click or other multiple-click interfaces.

Intelligent Agents to Ensure Multiple Forecasts & Encourage User Participation

In at least one non-limiting embodiment, the use of intelligent agents is employed to motivate users to make their own predictions and to ensure multiple forecasts for an element and to encourage user participation. It may be appreciated that a common concern of users who are considering whether to enter their own forecast information for the first time is whether they will get useful information back from the system and whether their time will be well invested or wasted. For example, if no other users have forecast on a particular element (such as for example on a particular stock), prospective contributing users may be less inclined to enter their own forecasts since the collective forecast they receive in return has no information other than what they themselves entered.

To at least partially solve this problem, it is optional but advantageous to seed or initialize the system with useful initial forecasts when few or no such forecasts exist. However, for systems and methods attempting to forecast on a large number of elements whose values are changing constantly (such as changing in the way stock prices change), seeding the system with useful initial forecasts that are recent and timely may become a significant problem.

One solution to this potential problem is to use intelligent agents that can forecast on demand. By constructing non-human intelligent agents (such as agents implementing artificial intelligence or AI capabilities) that have been programmed to follow one or various forecasting philosophies, rules, or policies; and, by programming agents to forecast on demand (e.g., on the same stocks and at almost the same time as human forecasters) it is possible to guarantee that every human forecaster will always get a collective forecast that includes forecasts other than his or her own, even if sometimes this means the other forecasts are from non-human intelligent agents rather than from other humans. The on-demand forecasts may be triggered by a user and potential forecaster accessing the system and identifying an element of interest (such as a stock of interest) or the on-demand forecast by the intelligent agents may wait for the user to provide their forecast input as the trigger to the agent forecast. Non-limiting embodiments of the invention may provide for either a single or a plurality of intelligent agents may be marshaled for the forecast, and when a plurality are marshaled they may be programmed with different forecasting philosophies, rules, or policies that represent a range of the perspectives and approaches that might be taken by human forecasters. The actual number may and choice of different forecasting philosophies, rules, or policies may be selected based on statistical considerations, human behavior considerations, the type of element being forecast, or some combination of these factors alone or in conjunction with other factors.

Because the weight of agents' predictions may advantageously be adjusted or modified based on performance, agents do not introduce undue or significant noise or error into the system, and, in some cases may even improve upon what human forecasters are able to do. Weighting forecasts based on prior objective forecaster performance is described in the referenced co-pending U.S. Patent Application System and Method for Forecasting Information Using Collective Intelligence from Diverse Sources, which is hereby incorporated by reference, and may optionally but advantageously be applied. In one embodiment, non-uniform weightings are applied to different forecasts and the weight applied to intelligent agent generated forecasts may be adjusted to diminish over time, to decrease to zero after a certain number of human forecasts have been received, or to otherwise be modified or changed in a predetermined or dynamically determined manner specified rules or policies established for that purpose.

In one preferred implementation or embodiment, users of the inventive system and method may choose how many, if any, non-human agent predictions to include in any given collective forecast so that the effect of the artificial intelligence based non-human agents can be understood and separated from the human collective intelligence if desired. In one embodiment, where some predetermined or dynamically determined percentage or absolute number of forecasts are made by one or more non-human agents, the user may be informed of that circumstance.

Exemplary Intelligent Queuing Capability

Non-limiting embodiments of the invention may optionally but advantageously provide an intelligent listing or queuing capability. Beyond securing user participation during the initial forecasting session, a well-designed forecasting system may advantageously make it easier for repeat visitors or repeat users to enter their forecasts. Moreover, since a users' time is or may be limited, whenever possible, the system should advantageously be designed to elicit the most valuable forecast information first—before users run out of time or attention. A known technique that can be used as a motivator in this regard is to allow users to select the elements (such as for example, stocks) for which they would like to forecast. The forecasting system described in the System and Method for Forecasting Information Using Collective Intelligence from Diverse Sources patent application, at least partially accomplished this goal by allowing users to type in the elements such as by using text names, stock symbols, or the like, for which they wanted to make forecasts. A disadvantage or drawback of this earlier system and method, however, is that typing (especially more than a few characters) takes more user effort than pointing or positioning a mouse and clicking a mouse button, or the equivalent with trackballs, capacitive or other finger-pad, or other pointing and button-like selection devices commonly found on desktop computers, notebook computers, personal data assistants (PDAs), cellular telephones, and the like information appliances. Moreover, if the user does not know the correct element (e.g., stock symbol) to type in, the user may usually need perform the additional task of a "symbol lookup" or the equivalent or analogous additional action for some other non-stock element to forecast. Such additional tasks may ultimately discourage at least some users and undermine the desire to increase the number of forecast contributions.

One alternative is to allow users to select elements (e.g., stocks) or groups of elements from a list by clicking a mouse. However this solution may also tend to consume valuable screen real estate and may have a limited ability to scale to screens of different sizes or to larger or smaller characters or symbols, or otherwise present scalability issues.

The present invention minimizes user effort by providing a default list of elements, that are advantageously pre-queued, for fast, single-click (or minimum click or user input involvement) forecasts. (In the stock forecasting domain, this approach is different from but at least superficially analogous to the system choosing a hidden default watch list whose elements will be revealed one at a time as the system solicits user forecasts.) The advantage of ease of use and speed for the user comes at the cost of predetermining what elements users will see. If users are unfamiliar with the element chosen by default, they may know nothing or very little on which to base their forecasts.

To address this problem and to provide a useful solution to it, the present invention also allows users to optionally override or modify the default element list (e.g., "hidden watch list") by typing in elements (e.g., stock symbols) after the manner of the system and method described in the System and Method for Forecasting Information Using Collective Intelligence from Diverse Sources patent application. However, whereas users of that earlier system would register (registration is additional work that some users are particularly loathe to do) in order for the system to remember their "watch list", in one embodiment of the invention the system and method automatically remembers each users' preference of elements using a cookie. The generation of useful Internet or web browser cookies are know in the art as are method for making and storing such cookies on a computer or information appliance. Other embodiments may use registration of some type, address information, or other use recognition or identification means where a user may either prefer not to store a cookie or where a cookie has been deleted. For returning users, the cookie (or other user identification means) tells the system to display the elements that users have previously typed in (e.g., their "watch list" stocks)—before elements on the default list. Thus in at least some non-limiting embodiments of the invention, the system and method maximize or at least attempt to maximize the potential usefulness of user forecasts by remembering the history of each user. In at least some embodiments, the user may be provided with an option to delete or purge all or part of their history.

It is possible to increase the usefulness of the information from users even further by optimizing the position of elements in the queue or information data structure based on other information, such as the forecast history for each element, not just a history of which elements were selected.

In experimental testing of the system and method, these novel elements—the one-click rating scale forecasting interface, the intelligent agents, and the intelligent queuing capability—individually and in combination, have led to significant benefits over previous forecasting system designs and forecasting methods.

It will be appreciated in light of the description provided herein that many variations of these exemplary embodiments and implementations are possible. The features and elements to be included in a particular implementation may depend at least in part upon the goals and objectives of different users and/or providers of the inventive system and method, therefore various features, elements, and options are described in the sections to follow.

Exemplary Adaptive Variation of One-Click Rating Scale Forecasting Interface

By way of example and not limitation, with respect to the exemplary one-click forecasting interface illustrated in and described relative to FIG. 1 and FIG. 2, a one-click rating scale with fixed or constant value labels is provided. In one non-limiting embodiment, the constant value labels are selected as −10%, −5%, −2%, −1%, 0, +1%, +2%, +5%, +10% and the like, though any value labels may be provided. As a variation, it will be appreciated in light of the description provided here that a computer programmer having ordinary skill in the art, in light of the description provided herein may readily adapt the exemplary embodiments and implementations illustrated and described herein to provide for a one-click rating scale that does not have any labels, or that has labels only at the extremes of the scale, or other non-label indicators.

An advantage of the fixed or constant label scheme that we have illustrated in the exemplary embodiment of FIG. 1 and FIG. 2, is that the user knows exactly what his or her click means in terms of providing forecast input to the system. However a possible disadvantage of such constant label scheme in some circumstances is that different users typically have different characteristics when it comes to clicking rating scales. Some users may be conservative and rarely use the extremes of the scale. Other users may be expressive and rarely use the center of the scale. Such differences between users are well documented in the rating scale literature.

One alternative approach to providing fixed or constant labels on the rating scale is to have the system dynamically and/or adaptively calibrate or modify the rating scale for each user on any one or more of various calibration or adjustment factors so as to maximize the accuracy of past predictions. In such an embodiment, a user may click on the rating scale without labels being shown (or with only the extremes of the scale labeled), or on up, down or unchanged indicators as may be appropriate. Adaptive algorithms, using statistical techniques known in the art, would determine an optimal labeling that might be referred to as an "invisible labeling" for each user's clicks that would compensate for the fact that each different particular user is likely to click on a scale differently, even when given the same information. The "invisible" adaptive labels need not actually be shown on the scale, but the system would know the adaptive values and use those adaptive values when tabulating the inputs from each user. Optionally, the user may be provided with a display of the value or forecast that was input, separate or apart from the labels.

Exemplary Variations on Intelligent Agents

With regard to the intelligent agents, variations may also or alternatively be provided and it will be apparent in light of the description provided herein that the intelligent agent or agents that provide the afore described seed or initial forecasts may be implemented as computer programs and that the particular philosophies, rules, policies, or the like that such intelligent agents are programmed with may be selected as desired. By way of example but not limitation, intelligent agents that mimic some of the popular strategies of traders (such as for example, so called "momentum trading" or other trading strategies) as well as some intelligent agents that provide a baseline for measuring human performance (e.g., the "flip a coin and guess" agent). Embodiments of the invention that provide intelligent agents that may not even utilize much intelligence, such as a random selection based agent, may be utilized, but are not preferred. One embodiment of an exemplary intelligent agent is set forth in the exemplary pseudo code for a prediction agent in Table I (See Appendix of Tables). The exemplary pseudo code is for prediction agents running Dow Jones Industrial Average ("Dow"), NAS-DAQ, Standard & Poors 500 ("S&P 500") predictions or forecasts. These agents take into account whether or not predictions have been made within a certain time period of the present time.

Another useful class of non-human agent variations is to use intelligent agents that generalize from the successful predictions of humans (or any other agents) on a limited set of elements to a larger set of elements. For example, in the domain of stock price forecasting, a relatively large number of humans may forecast the movements of the NASDAQ index, but few or no humans may forecast stock price movements for a small technology company. A simple or crude agent might be programmed to forecast according to the theory that when accurate humans forecast the NASDAQ to increase, the agent should forecast that the stock price for small technology companies (perhaps those without any human predictions) will also go up. If this simple or crude generalization agent does well, then the weighting algorithms (known in the art or such as specified in the referenced System and Method for Forecasting Information Using Collective Intelligence from Diverse Sources patent application) will give it significant weight. Otherwise its input will be obscured by more accurate agents or humans. It will be apparent in light of the description provided herein that many variations of generalization agents can be constructed and allowed to compete amongst themselves and/or with other human forecasters.

Exemplary Variations on Intelligent Queuing Capability

The intelligent queuing capability and/or format of the intelligent queue may also or alternatively varied. As described elsewhere herein, if it is desired to improve or indeed to maximize or attempt to maximize the useful information from system users in the minimum amount of time, then it makes sense to ask for forecasts (e.g., price forecasts for stocks) where users are likely to have the most information first. To this end, in one exemplary but non-limiting embodiment of the improved forecasting system and method, the forecasting system and method remembers, via a cookie, the forecasts that users made in the last (or other previous) time, and displays these same items (e.g., stocks) to get new forecasts the next time the same user uses or accesses the system. Other data sets, tokens, storage methodologies, or identification schemes or techniques may be utilized where the use of cookies does not provide a preferred approach either due to security issues or user computer preferences against storing cookies on their computer or other information appliance with which the user accesses the system.

This method is superior to simply requesting forecasts on elements (e.g., stocks) in a random or a set order since users who have predicted or forecast specific elements (e.g., stocks) in the past are likely to have useful information about those same elements in the future, at least for some reasonable future period. This method also has the virtue of being simple and easily understandable by users, because they are familiar with other types of systems that remember lists of things for them in the order in which they first created or encountered the list (e.g., "watch lists").

However, it is also possible to optionally construct variations of the intelligent queuing scheme that not only remember which elements (e.g., stocks) users predicted a last or other previous time or session, but also or alternatively to reorder the elements so as to obtain the most information from the user in the least amount of time.

In one non-limiting embodiment, recent symbols, favorite symbols, processing or lists, and generation and handling or cookies are taken care of in software, such as by computer program software of the type listed in Table 2 (See Appendix of Tables) for Exemplary Code for Recent and Favorite Symbols. Table 3 (See Appendix of Tables) includes a listing of exemplary computer program code for an exemplary interface.

The historical forecasts that users made may be used to reorder the queue of symbols (or other information indicators) which the system remembers via a cookie or via other means. For example, in the domain of stock forecasting, the most common forecasts for any given stock are typically for small change or no change in stock price. Because these forecasts are most likely, the information content (as can be proved from theorems in Information Theory) is less than the information contained in more extreme forecasts.

In other words, generally, the more extreme the forecasts are, the more information those forecasts may contain. Thus, one way to maximize the useful information obtained by the system in the shortest time is to look at all of the stock symbols for which a user has made forecasts in the past (e.g., those remembered by the cookie) and then order these stock symbols so that the symbols with a history of more extreme forecasts are placed first in the queue. When a user returns to the site, not only will the system remember which symbols the user predicted or forecast on before, but also the system will present these symbols in an order so that those symbols where the user historically has made the most extreme predictions come before symbols with less (historically) extreme predictions. The result is the maximum information obtained from the user in the minimum amount of time.

Other intelligent queuing variations are also possible and may additionally and/or alternatively be implemented, using a variety of techniques that will be apparent to computer programmers having ordinary skill in the art in light of the description provided herein. Again using stock forecasting as an example domain, a user may have a short queue of symbols that he or she has typed in or otherwise provided, or may even have no user-entered queue at all. Still the system can attempt to re-order the default queue of symbols based on some set of rules, policies, or procedures, such as for example by using category analysis and/or statistical associations derived from that particular user and/or all users of the system.

Specifically, consider the case where a user has made extreme predictions on several technology stocks that all are traded on NASDAQ. (An exemplary prediction of this type may for example be a prediction containing large amounts of information in an Information Theoretic sense where information is correlated with the rarity of events.) NASDAQ is a common category that links forecasts containing high amounts of information for this user. In one non-limiting embodiment, the inventive system and method may intelligently reorder a default queue (and/or the queue of stocks remembered by a cookie or other means) to display NASDAQ stocks first for this user, since that is likely to be the best strategy for obtaining the most information in the shortest amount of time from this user.

Consider another case, still in the stock forecasting domain. For purpose of explanation but not as a limitation of the invention, assume that across all users, the system calculates that users who forecast or predict accurately on Yahoo are also likely to forecast or predict accurately on Google and Ask Jeeves (all Internet search companies). The system can then proactively reorder, or insert, Google and Ask Jeeves, in the queue of stocks being presented to a user who says that she/he wants to forecast a future state or stock for Yahoo. The user does not need to type in symbols for Google and Ask Jeeves. The system intelligently determined or calculates that Google and Ask Jeeves should be presented to this user because other users who predicted on Yahoo typically also had accurate forecasts Google and Ask Jeeves. This intelligent determination or calculation may be based on or utilize any one or combination of statistical algorithms well known in the art, This approach is at least superficially somewhat similar to the collaborative filtering methods used by Amazon, NetFlix, and others in which products are recommended based on "what other users who bought your product also liked." However, one key difference is that in the present invention, elements are not recommended; they are inserted and/or re-ordered in a queue or other data structure. Furthermore, in at least one non-limiting embodiment, the basis for the insertion, ordering, or reordering is not whether someone liked an element but rather how well they performed on a given task—in this case predicting or forecasting.

The logic is: "Other people who forecast well on ABC also tended to forecast well on XYZ." By quantifying the correlation between ABC and XYZ it is possible to determine not only whether XYZ should be shown to someone forecasting on ABC, but also when (e.g., where in a list) XYZ should be located, ranked, or shown.

The result of this and the other innovations described above is that the inventive system and method obtains the maximum useful information with the minimum of time and effort from the user. The inventive method may be implemented as a computer program executing within a processor and memory of a general purpose computer (such as of a server computer).

Having now described numerous aspects and embodiment of the invention including many optional features, attention is directed to the description of certain selected embodiments that include particular combinations of features.

Figure 4:
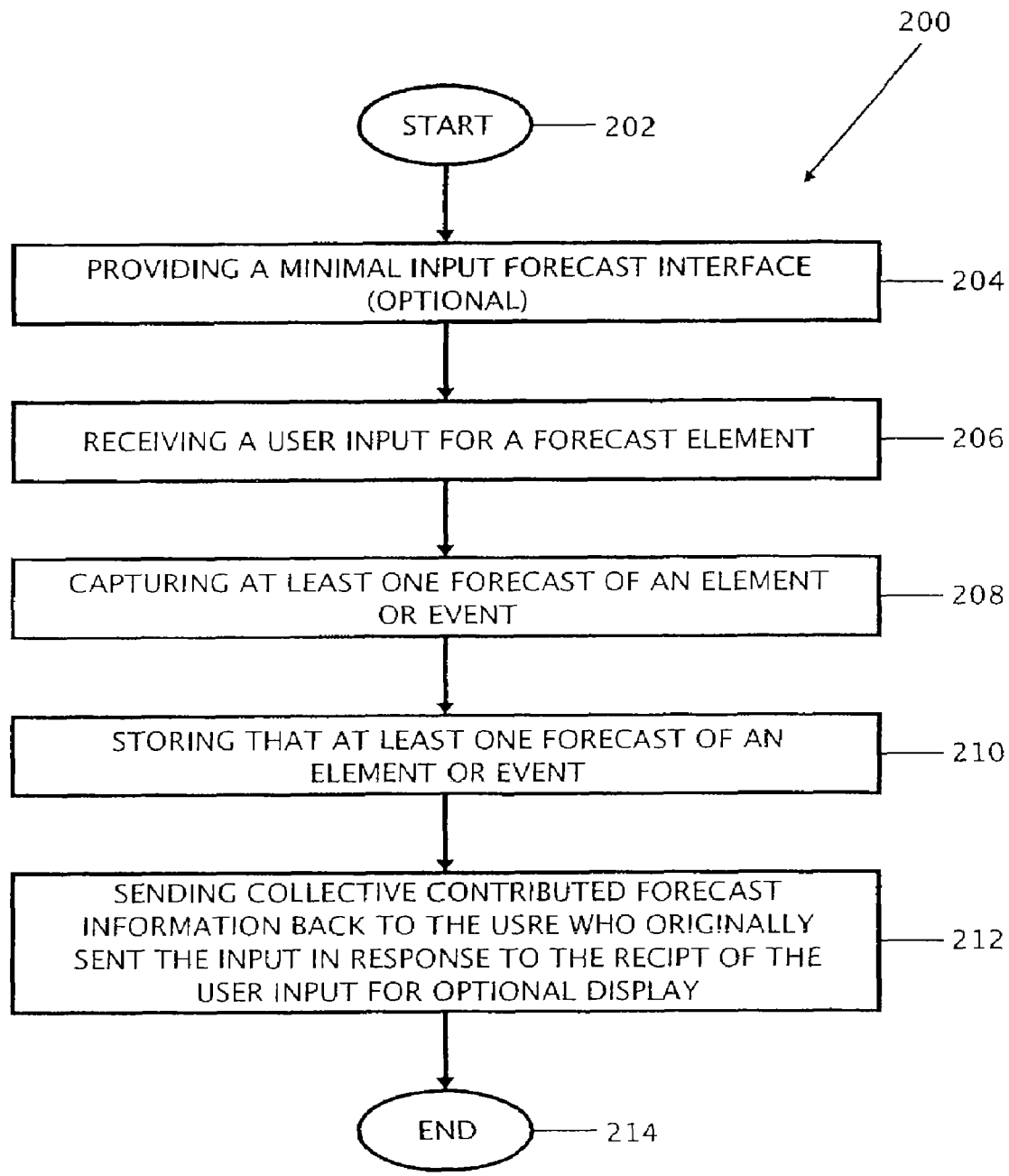
FIG. 4 is an illustration showing a method for real-time on-line interactive forecasting of an element according to an embodiment of the invention.

In one embodiment, the invention provides a method for real-time on-line interactive forecasting of an element, the method comprising: providing a minimal input forecast interface; receiving a user input for a forecast element; and capturing at least one forecast of an element or event, storing that at least one forecast of an element or event, and sending collective contributed forecast information back to the user who originally sent the input in response to the receipt of the user input for optional display. This embodiment is illustrated in FIG. 4.

In another embodiment (2), this method further comprises displaying or causing the display of the collective contributed forecast information sent to the user.

In another embodiment (3), this method further comprises generating at least one forecast for an element (for a plurality of elements) using a non-human intelligent agent programmed to follow a predetermined or dynamically determined forecasting philosophy, rule, or policy; and seeding a particular forecast element with the at least one generated forecast when no prior forecast for the particular forecast element exists at the time a human contributor contributes a forecast or requests forecast information for the particular element.

In another embodiment (4), this method further comprises sending the user a consensus forecast generated from a plurality of user contributed forecasts for the same element for which the user forecast was received, the sending being in response to and substantially in real time with the receipt of the forecast submission by the user.

In another embodiment (5), this method further requires that the pre-queuing a list of elements for fast forecasting is in order to solicit a predetermined set of identified valuable information as a priority over other information and providing an override capability.

In another embodiment (6), this method further requires that the minimal input forecast interface comprises a one-click scale forecasting interface.

In another embodiment (7), this method further requires that the minimal user input interface consists of a single-click scale forecasting interface.

In another embodiment (8), this method further requires that the pre-queuing of a list of elements for fast forecasting comprising pre-queuing the list of elements for fast one-click interactive forecasting.

In another embodiment (9), this method further requires that the minimal user input interface comprises a single-click interface in combination with a scale for generating a numerical value input as a result of the single click, the value depending upon the location of a graphical on-screen pointer or icon for determining the numerical value, and the value changing with the location of the screen pointer or icon on the display screen.

In another embodiment (10), this method further requires that the method further comprises providing adaptive variation of the one-click rating scale forecasting interface.

In another embodiment (11), this method further comprising dynamically and/or adaptively calibrating or modifying the scale for each user so as to improve the accuracy of predictions and forecasts.

In another embodiment (12), this method further requires that (a) the system is easy to use initially; (b) has some forecasts at the time the user first uses the system; and (c) becomes even easier to use upon repeated use.

In another embodiment (13), this method further requires that a single user input action based interface captures a single forecast of an element or event, stores that forecast, and displays useful collective forecast information back to the user all with a single click.

In another embodiment (14), this method further requires that a single-click interface captures a single forecast of an element or event, stores that forecast, and displays useful collective forecast information back to the user all with a single click.

In another embodiment (15), this method further requires that user effort is minimized by the forecast input interface and user feedback in response to the one-click input is almost immediate so that the single-click rating scale interface and substantially immediate consensus forecast feedback helps maximize the number of forecasts per user.

In another embodiment (16), this method further requires that the interfaces is provided in a forecasting system that initiates all of the actions required for accepting, storing, generating, and displaying a collective forecast.

In another embodiment (17), this method further requires that the at least one non-human intelligent agents is a computer implemented artificial intelligence based agent.

In another embodiment (18), this method further requires pre-queuing a list of elements for fast forecasting.

In another aspect, the invention provides a method (19) for real-time on-line interactive forecasting of an element, the method comprising: pre-queuing a list of elements for fast forecasting; receiving a user input for a forecast element; and capturing at least one forecast of an element or event, storing that at least one forecast of an element or event, and sending collective contributed forecast information back to the user who originally sent the input in response to the receipt of the user input for optional display.

In another embodiment (20), this method further requires providing a minimal input forecast interface.

In another aspect, the invention provides a system (20) for real-time on-line interactive forecasting of an element, the system comprising: a minimal input forecast interface; a receiver block for receiving a user input for a forecast element; a capture block for capturing at least one forecast of an element or event; a storage device for storing that at least one forecast of an element or event; and communications device for sending collective contributed forecast information back to the user who originally sent the input in response to the receipt of the user input for optional display.

In another embodiment (21), this system further includes a minimal input forecast interface.

In another aspect, the invention includes a system (22) for real-time on-line interactive forecasting of an element, the system comprising: a pre-queuing block for queuing a list of elements for fast forecasting; a receiver block for receiving a user input for a forecast element; a capture block for capturing at least one forecast of an element or event; a storage device for storing that at least one forecast of an element or event, and communications device for sending collective contributed forecast information back to the user who originally sent the input in response to the receipt of the user input for optional display.

In another embodiment (24), this system further includes a pre-queuing block for queuing a list of elements for fast forecasting.

In another aspect, the invention includes a computer program product stored on tangible media or residing in an electronically readable and accessible form, the computer program product including executable instructions for modifying the operation of a single computer or a plurality of computer to operated to provide a real-time on-line interactive forecasting of an element, the computer program instructions including instructions for: either: (i) providing a minimal input forecast interface, or (ii) pre-queuing a list of elements for fast forecasting, or both; receiving a user input for a forecast element; and capturing at least one forecast of an element or event, storing that at least one forecast of an element or event, and sending collective contributed forecast information back to the user who originally sent the input in response to the receipt of the user input for optional display.

Headers and sub headers provided in this specification are merely provided as a guide to the reader as to the primary description provided in that section. As aspects of the invention and its embodiments are described throughout the specification and in the drawings and claims, these headers and sub headers should not be used to limit the scope of the invention in any way.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

I claim:

1. A method for real-time on-line interactive forecasting of an element, the method comprising:
   identifying a first particular user who has accurately forecast a first element;
   determining, using a user forecasting accuracy performance based statistical algorithm, at least one second element to present to the first particular user when the first particular user attempts to forecast on the first element, the at least one second element being determined on a basis that other different users/contributors who had accurately forecast on the first element had also accurately forecast on the at least one second element; and
   proactively prompting the first user with the at least one second element when the user identifies a desire to forecast the first element, the proactively prompting of the at least one second element occurring automatically without the first user identifying the at least one second element, and the proactively prompting is performed using an ordered forecasting queue and the ordering in the forecasting queue is determined at least in part using a collective intelligence analysis.

2. The method of claim 1, wherein the determining farther comprising:
   quantifying a correlation between the first element and the at least one second element, and determining (i) that the at least one second element should be identified in the queue of elements for forecasting to present to the first particular user, and (ii) the ordered location of the at least one second elements in the queue of elements.

3. The method of claim 1, wherein the method obtains the maximum useful information from the user with a minimum time and effort from the user.

4. The method of claim 1, wherein the prompting of the first user with the at least one second element occurs at the time they are forecasting the first element.

5. The method of claim 1, wherein the prompting is performed when the first user identifies the first element to be forecast.

6. The method of claim 1, wherein the prompting is performed after the first user forecasts the first element.

7. The method of claim 1, wherein the prompting is performed using a forecasting queue by inserting the at least one second element into the forecasting queue.

8. The method of claim 1, wherein the prompting is performed using the forecasting queue by reordering the at least one second element to have a different position from the position before the reordering in the forecasting queue.

9. The method of claim 8, wherein an order or reordering of the elements in the queue are determined using collaborative filtering.

10. The method of claim 8, wherein an order or reordering of the elements in the queue are determined by statistical correlation methods for determining relationships between the elements.

11. The method of claim 8, wherein an order or reordering of the elements in the queue are determined using a neural network approach.

12. The method of claim 1, wherein the prompting is performed using a forecasting queue by inserting the at least one second element into the forecasting queue at a particular position within a multi-element forecasting queue.

13. The method of claim 1, wherein the prompting comprises inserting in an element forecast queue, or reordering to a higher position in the stock forecast queue when already present in a stock forecast queue, the at least one second element.

14. The method of claim 1, wherein the at least one second element is in the same class or a related class to the first element.

15. The method of claim 1, wherein the at least one second element consists of a second element.

16. The method of claim 1, wherein the at least one second element comprises a plurality of second elements.

17. The method of claim 1, wherein the prompt comprises a list with clickable web interface.

18. The method of claim 1, wherein the at least one second element is related to the first element.

19. The method of claim 18, wherein the relatedness is that the second element belongs to the same industry group as the first element.

20. The method of claim 19, wherein the relatedness is that the second element belongs to the same industry group as the first element and the first element is an element for an Internet company.

21. The method of claim 1, wherein the first element belongs to a first class of elements and the at least one second element belongs to the same first class of elements.

22. The method of claim 1, wherein the element comprises at least one of a stock price or value, a commodity price or value, a bond price or value, and a security price or value.

23. The method of claim 1, wherein the selection of the at least one second element is determined by a statistical correlation for determining relationships between the first element and the at least one second element.

24. The method of claim 1, wherein the first element and second element are each selected from the set consisting of: a stock price, an option price, an ETF price, a mutual fund price, a commodities price, a currency exchange rate, a real estate price, an interest rate, a bond yield, a derivative, an insurance cost or price, a credit rating, a risk metric, a default rate, a news event, a sporting score, a bond price, a security price, an inventory figure, a sales figure, a consumer confidence estimate, a financial information, a vacation plan, a traffic route, an election result, a prediction of an action or actions by individuals, a prediction of an action or actions by groups, a prediction of an action or actions by companies, a prediction of an action or actions by governments, a prediction of an action or actions by an electorate, and combinations of any two or more of these.

25. The method of claim 1, wherein said ordered forecasting queue includes a single queue element.

26. The method of claim 1, wherein said ordered forecasting queue includes a plurality of queue elements.

27. A computer implemented method for real-time on-line interactive forecasting of an element, the method comprising:
    receiving a request from a first particular user to forecast an element from a first client computer;
    identifying on a server computer in response to the received request that the first particular user has previously forecast a first element;
    determining, using a user forecasting accuracy performance based statistical algorithm executing in software on the second computer, at least one second element to present to the first particular user when the first particular user attempts to forecast on the first element, the at least one second element being determined on a basis that other different users/contributors who had historically accurately forecast on the first element had also historically accurately forecast on the at least one second element; and
    proactively prompting the first user with the at least one second element when the user identifies an intention to forecast on the first element, the proactively prompting of the at least one second element to the particular first user occurring automatically without the first user identifying the at least one second element, and the proactively prompting is performed using an ordered forecasting queue and the ordering in the forecasting queue is determined at least in part using a collective intelligence analysis.

28. The method of claim 27, wherein the determining comprising quantifying a correlation between the first element and the at least one second element, and determining (i) that the at least one second element should be identified in the queue of elements for forecasting to present to the first particular user, and (ii) the ordered location in the queue of elements for forecasting.

29. The method of claim 27, wherein at least one of the following:
    (i) the prompting the of the first user with the at least one second element occurs at the time they are forecasting the first element,
    (ii) the prompting is performed when the first user identifies the first element to be forecast;
    (iii) the prompting is performed after the first user forecasts the first element; (iv) the prompting is performed using a forecasting queue by inserting the at least one second element into the forecasting queue;
    (v) the prompting is performed using a forecasting queue by reordering the at least one second element to have a different position from the position before the reordering in the forecasting queue;
    (vi) the prompting is performed using a forecasting queue by inserting the at least one second element into the forecasting queue at a particular position within a multi-element forecasting queue; and
    (vii) the prompting comprises inserting in an element forecast queue, or reordering to a higher position in the stock forecast queue when already present in a stock forecast queue, the at least one second element.

30. The method of claim 28, wherein the prompting is performed using ordering or reordering and an order or reordering of the elements in the queue are determined using at least one of (i) collective intelligence analysis, (ii) using collaborative filtering, (iii) statistical correlation methods for determining relationships between the elements, and (iv) neural network approach.

31. The method of claim 27, wherein at least one of the following applies: (i) the at least one second element is in the same class or a related class to the first element; (ii) the at least one second element comprises a second element; and (iii) the at least one second element comprises a plurality of second elements.

32. The method of claim 27, wherein the prompt comprises a list with clickable web interface.

33. The method of claim 27, wherein the at least one second element is related to the first element; the relatedness is that the second element belongs to the same industry group as the first element; and the relatedness is that the second element belongs to the same industry group as the first element and the first element is an element for an Internet company.

34. The method of claim 27, wherein identifying on a server computer in response to the received request that the first particular user has previously accurately forecast a first element.

35. A system for real-time on-line interactive forecasting of an element, the system comprising:
   a server configured for receiving a request from a first particular user to forecast an element from a first client computer;
   a database storing historical forecast information for a plurality of users and for particular forecast elements;
   means for identifying on the server computer in response to the received request and the historical forecast information that the first particular user has previously accurately forecast a first element;
   means for determining, using a user forecasting accuracy performance based statistical algorithm executing in software on the server computer and accessing the database, at least one second element to present to the first particular user when the first particular user attempts to forecast on the first element, the at least one second element being determined on a basis that other different users/contributors who had historically accurately forecast on the first element had also historically accurately forecast on the at least one second element; and
   means for proactively sending a prompt to the first user on the first client computer with the at least one second element when the server computer receives a user intention to forecast on the first element, the proactively prompting of the at least one second element to the particular first user occurring automatically without the first user identifying the at least one second element; and the proactively prompting is performed using an ordered forecasting queue and the ordering in the forecasting queue is determined at least in part using a collective intelligence analysis.

36. The system of claim 35, wherein the means for determining further comprises a correlator for quantifying a correlation between the first element and the at least one second element and for determining (i) that the at least one second element should be identified in the queue of elements for forecasting to present to the first particular user, and (ii) the ordered location in the queue of elements for forecasting.

37. The system of claim 35, wherein said ordered forecasting queue includes at least one queue element.

38. A method for real-time on-line interactive forecasting of an element, the method comprising:
   receiving a plurality of different user inputs for a forecast of an element;
   capturing the plurality of different user input contributions for the forecast of the element;
   generating an updated collective contributed forecast information based on the plurality of different user inputs for the forecast of the element as each different user input contribution is received; and
   sending the updated collective contributed forecast information back to each user who made an input contribution;
   identifying a first particular user who has accurately forecast a first element;
   determining, using a user forecasting performance based statistical algorithm, at least one second element to present to the first particular user when the first particular user e attempts to forecast on the first element, the at least one second element being determined on a basis that other different users/contributors who had accurately forecast on the first element had also accurately forecast on the at least one second element; and
   proactively prompting the first user with the at least one second element when the user identifies a desire to forecast the first element, the proactively prompting of the at least one second element occurring automatically without the first user identifying the at least one second element and the proactively prompting is performed using an ordered forecasting queue and the ordering in the forecasting queue is determined at least in part using a collective intelligence analysis.

39. A computer program stored on a tangible computer readable storage medium for execution on a computer that when executed in a processor of the computer executes a method for real-time on-line interactive forecasting of an element, the method comprising:
   identifying, in a first server computer, a first particular user who has accurately forecast a first element;
   determining, in a first server computer or in a second server computer, using a user forecasting accuracy performance based statistical algorithm, at least one second element to present to the first particular user when the first particular user attempts to forecast on the first element, the at least one second element being determined on a basis that other different users/contributors who had accurately forecast on the first element had also accurately forecast on the at least one second element; and
   proactively prompting the first user on a user computer different from said first and second server computer, with the at least one second element when the user identifies a desire to forecast the first element, the proactively prompting of the at least one second element occurring automatically without the first user identifying the at least one second element, and the proactively prompting is performed using an ordered forecasting queue and the ordering in the forecasting queue is determined at least in part using a collective intelligence analysis.

40. The computer program stored on a tangible computer readable storage medium as in claim 39, wherein said ordered forecasting queue includes at least one queue element.

* * * * *